Dec. 8, 1970     J. N. KERR     3,545,146
CERAMIC-PLASTIC RADOME
Filed Jan. 29, 1965     2 Sheets-Sheet 1
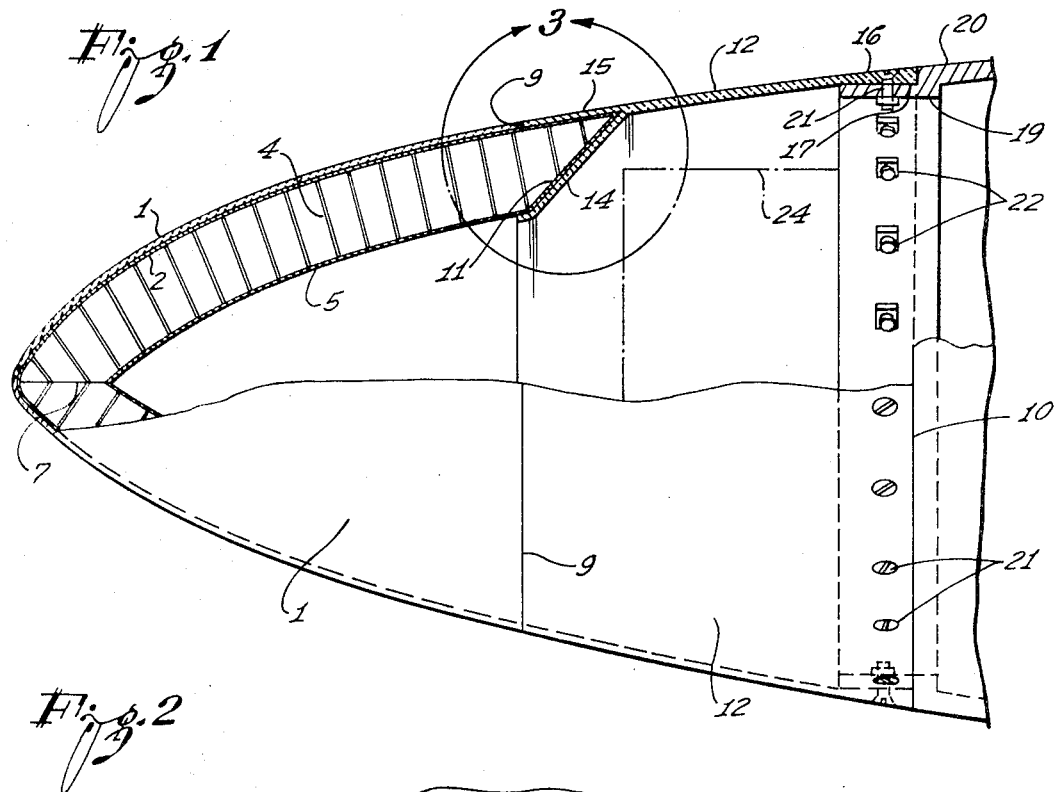
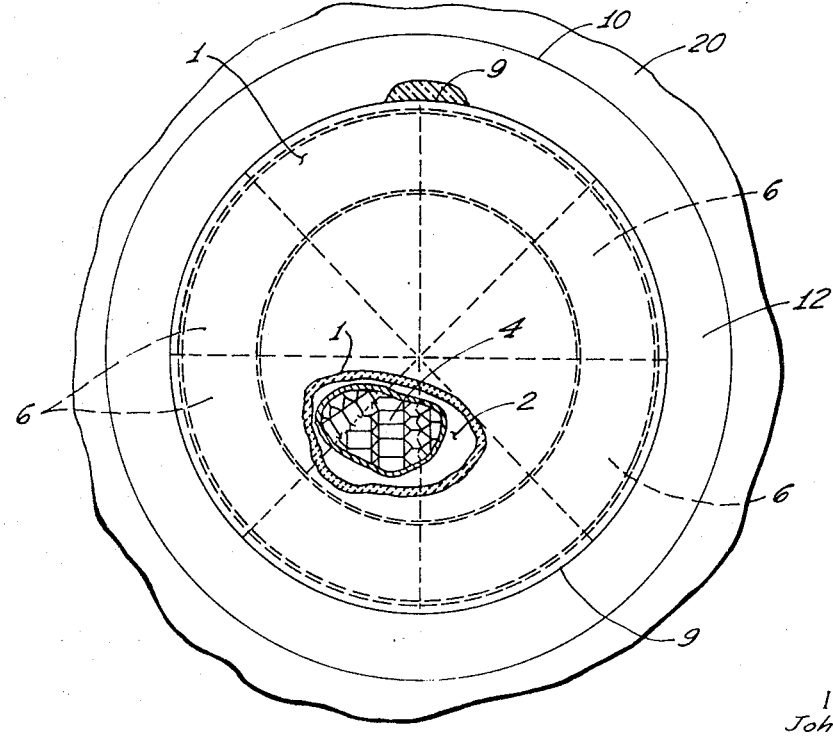
INVENTOR.
John N. Kerr
By Willard M Graham
Agent Dec. 8, 1970  J. N. KERR  3,545,146
CERAMIC-PLASTIC RADOME
Filed Jan. 29, 1965  2 Sheets-Sheet 2

INVENTOR.
John N. Kerr

By Willard M Graham
Agent 3,545,146
CERAMIC-PLASTIC RADOME
John N. Kerr, Thousand Oaks, Calif., assignor to Northrop Corporation, Beverly Hills, Calif., a corporation of California
Filed Jan. 29, 1965, Ser. No. 428,981
Int. Cl. E04b *1/32, 1/76;* H01q *1/42*
U.S. Cl. 52—80       10 Claims

ABSTRACT OF THE DISCLOSURE

A radome assembly of a thin outer ceramic shell with a plastic honeycomb inner strengthening wall construction bonded thereto and a resin-treated glass fiber material transition section fixed to the base thereof for attachment to a supporting body.

---

The present invention relates to radio transparent structural housings, and more particularly, to such structures adapted for use in high speed, high temperature environments such as aircraft and missiles encounter.

The use of ceramics in aircraft nose cones and the like is known. However, there are disadvantages to these presently known structures due to the expense, brittleness, and weight thereof, for example, and their relative expansion caused by thermal shock.

It is an object of this invention to provide a light weight radome type structure having superior qualities with respect to the aforementioned disadvantages.

Briefly, my invention comprises an assembly of a thin outer ceramic shell with a plastic inner strengthening wall construction bonded thereto for optimum electromagnetic wave transmission through this assembly, there being a suitable transition section integral with the base thereof for attachment to a supporting body.

This invention will be more fully understood by reference to the following detailed description of a specific embodiment and to the accompanying illustrative drawings thereof, wherein:

FIG. 1 is a side elevation view, partly in longitudinal section, of a nose radome, showing its construction and means of attachment to a forward section of an aircraft for example.

FIG. 2 is a front view, partly cut away, of the assembly shown in FIG. 1.

Figure 3:
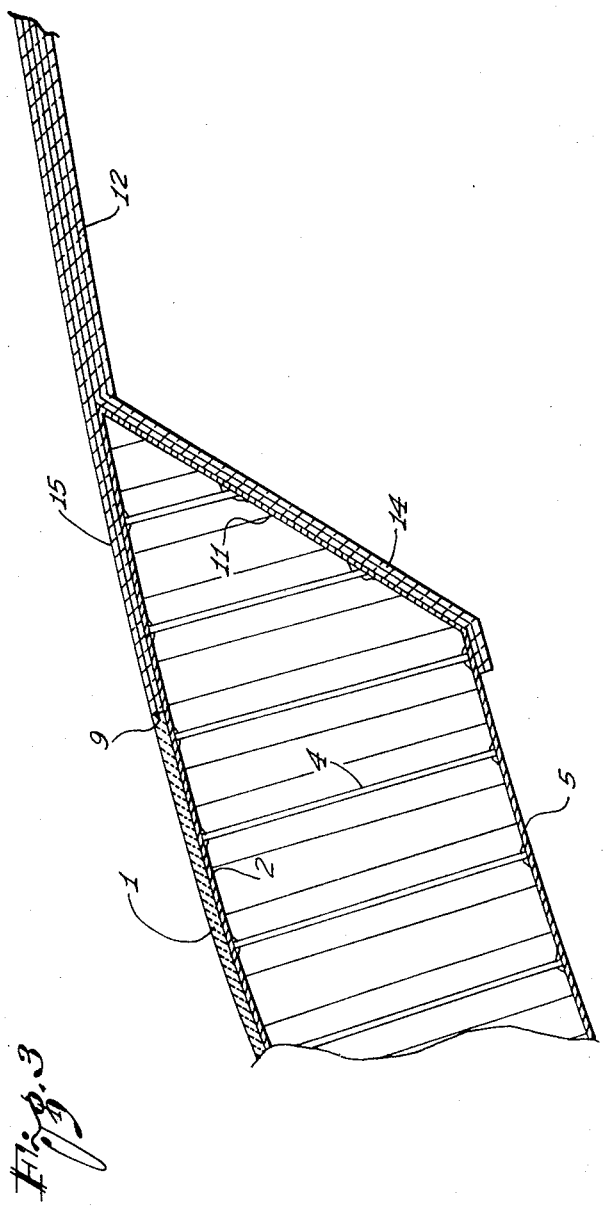
FIG. 3 is an enlarged detail view of a portion of the radome indicated by the large numeral 3 in FIG. 1, showing the connection between the ceramic and honeycomb front section and the plastic transition section.

Referring first to FIG. 1 for a detailed description of the present embodiment, a generally conical formed ceramic shell 1 is provided at the forward end of a radome. The shell 1 may be of any type ceramic, such as alumina or fused silica, for example. An outer skin 2 of fiber glass is bonded to the inner surface of the shell 1. A honeycomb core 4 of plastic, such as hardened fiber glass, for example, is bonded to the inner side of the outer skin 2, and an inner skin 5 of similar material is bonded to the inner side of the honeycomb core 4. In one embodiment of a 10-inch long radome, for example, the ceramic shell is about .025 inch thick, and the inner and outer skins may be about .010 to .030 inch thick.

The honeycomb core 4 is preferably made of post-formed pie-shaped sectors 6 having the desired curved shape to fit the shell. At the inside forward point, the sectors 6 are beveled to come together at a common central edge 7.

The ceramic shell 1 ends at a base edge 9 located a suitable distance forward of the radome rear edge 10, as will be explained later. As shown in FIGS. 1 and 3, the honeycomb core 4 also ends near the base edge 9. In this area, a tapered edge 11 of the core 4 and inner skin 5 extends outwardly to join a transition section 12 made of several layers of resin-treated glass fiber material. The transition section 12 has at its forward end some of the layers thereof bonded along the tapered edge 11 as an edge reinforcement 14, and some of the outer layers 15 thereof continued along the outside to meet the shell base edge 9 and form a flush outer surface therewith.

At the rear of the transition setcion 12, a molding 16 is provided with a substantially cylindrical inner surface 17 for securing to a stepped flange 19 of an aircraft nose 20, for example. The radome may be secured with screws 21 and nuts 22 for example.

The forward end of the radome carrying the ceramic shell 1 and honeycomb core 4 forms the critical "window" area for an antenna installation 24 which can be mounted in the nose 20. The thinner wall construtcion of the transition section 12 thus provides greater diametrical space for the antenna 24 and allows an economy of space to be obtained. That is, if the relatively thick honeycomb core 4 were to be extended farther aft, the entire radome would have to be made larger in diameter to house a given size of antenna.

A more important function of the transition setcion 12, however, is to allow for differential thermal expansion and provide a relatively flexible junction of the radome with the aircraft nose 20. This relatively flexible junction will permit use of an out-of-bound shape of the shell base edge 9. Since the ceramic is relatively brittle (as compared to the fiber glass transition section 12) and very difficult to manufacture without a slight out-of-round shape, this prevents cracking of the ceramic shell 1 when mated with a metal aircraft nose 20 or other structure.

All the plastic (fiber glass) components herein are of course hardened as is conventional in plastic constructions. The ceramic shell 1 is utilized because of its exceptional heat resistant characteristics and resistance to erosion as by rain for example. It is strengthened by the fiber glass inner construction which is also thinner than the required parts would have to be if the core and skins were all ceramic, thus giving superior electromagnetic wave transparency than an all ceramic structure. Further, this combination is much more resistant to thermal shock, since ceramic core portions would break instead of deforming the necessary amount under the high heat concentrations to which the aircraft or missile is intended to be exposed.

The outer skin 2 may be eliminated if desired, but it will impart strength to the relatively thin ceramic shell 1 under impact from small particles which would otherwise crush the shell at positions over the openings of the honeycomb core 4. Even raindrops become extremely hard when striking an object at great speeds.

As an example of the method of fabrication of the present invention, the ceramic shell 1 is formed separately, using the slip-cast method. A mixed slurry of the ceramic components and water is poured into a plaster mold to fill the same. After an accurately measured period of time (10 seconds for example), the mold is emptied, leaving a film. When dried, the film is removed as a formed shape, which is then fired in a kiln at temperatures gradually increasing to around 2500° F., for example.

The outer skin 2, impregnated with an epoxy resin, is layed up inside the shell 1 and is cured in a vacuum bag.

The inside of the outer skin 2 is preferably sanded, heated to around 120° F. and coated with a suitable adhesive, such as a thin coat of a modified epoxy adhesive. The outside surface of the formed honeycomb core sectors 6 is rolled with the same kind of adhesive, and is then preferably covered with a fiber glass scrim cloth coated on the outside with the adhesive. The core sectors are then installed into the shell against the outer skin 2, a vacuum bag is applied, and this sub-assembly cured at 275° F. for about two hours.

After the bag is removed and irregularities sanded, the outside of the inner skin 5 and the inner surface of the honeycomb core 4 are coated with the modified epoxy adhesive and a scrim cloth is applied on the honeycomb core 4. The inner skin 5 is installed in place, and a vacuum bag again applied around the assembly. It may be cured for one hour at about 200° F. and for two more hours at about 275° F.

The transition section 12 is built up on a plaster preform tool, then transferred to the shell assembly, vacuum bagged, and cured.

Thus it is seen that an exceptionally improved radome is provided by the present invention. It is particularly well adapted for use with an antenna and associated electronic equipment operating at microwave frequencies in the vicinity of and including the S, C, X, and K bands, for example. It withstands high heat concentrations and severe erosion conditions, and is therefore highly desirable on high speed missiles, re-entry vehicles and the like. Moreover, its cost is much less than that of an all-ceramic radome of comparable performance qualities, in addition to the other enumerated advantages.

What is claimed is:

1. An article of the class described comprising a ceramic outer member, a honeycomb-like core of non-metal material secured to the inner side of said ceramic outer member, and a non-ceramic extension fixed to said core material only, said extension adapted to be mounted on a supporting structure.

2. Apparatus in accordance with claim 1 wherein said extension is flush with the outer surface of said ceramic member.

3. Apparatus in accordance with claim 1 wherein said ceramic member is substantially conical in shape, said extension being fixed at the base thereof flush with the outer surface thereof.

4. An article of the class described comprising a substantially conical shaped ceramic outer member, a honeycomb-like core of non-metal material secured to the inner side of said ceramic outer member, and a non-ceramic extension fixed to said core material at the base of said ceramic outer member and being flush with the outer surface of said member, said core material comprising sector-shaped pieces having their points at the peak of said conically shaped ceramic member, said extension adapted to be mounted on a supporting structure.

5. A radome or the like comprising a compound curved ceramic shell, a plastic honeycomb core secured to the inner side of said shell, and a relatively flexible mounting section connected to said core only, as a continuation of said shell.

6. A radome or the like comprising a substantially conical ceramic shell having a base edge; a reinforcing structure including a plastic outer skin bonded to the inner side of said shell, a plastic honeycomb core bonded to the inner surface of said outer skin, and a plastic inner skin bonded to the inner surface of said core; and a quasi-cylindrical plastic transition section having one end thereof bonded to said reinforcing structure at said base edge of said shell, the other end of said transition section adapted to be mounted on a supporting structure.

7. Apparatus in accordance with claim 6 wherein the wall thickness of said transition section is appreciably less than the nominal combined thickness of said reinforcing structure and ceramic shell.

8. A radome or the like comprising a substantially conical ceramic shell having a base edge; a reinforcing structure including a plastic outer skin bonded to the inner side of said shell, a plastic honeycomb core bonded to the inner surface of said outer skin, and a plastic inner skin bonded to the inner surface of said core; and a quasi-cylindrical plastic transition section having one end thereof bonded to said reinforcing structure at said base edge of said shell, the other end of said transition section adapted to be mounted on a supporting structure; wherein said honeycomb core has a rear edge tapered outwardly and rearwardly in section to meet said outer skin, said transition section having plastic laminates, some of said laminates at the forward end being bonded along said tapered edge, and other of said laminates at the forward end being bonded to said outer skin at said base edge of said shell and flush with the outer surface of said shell.

9. A radome or the like comprising a substantially conical ceramic shell having a base edge, a reinforcing structure including a plastic honeycomb core, means bonding said core to the inner surface of said shell, said reinforcing structure extending slightly beyond said base edge of said shell and having a rear edge tapered outwardly and rearwardly, a quasi-cylindrical plastic transition section having laminates at the forward end thereof, some of said laminates being bonded along said tapered edge, and other of said laminates being bonded to the extended portion of said reinforcing structure at said base edge of said shell and flush with the outer surface of said shell.

10. Apparatus in accordance with claim 9 wherein said core and said transition section are of resin-impregnated glass fibers, and wherein the inner diameter of said radome is appreciably greater just rearward of the bonded joint between said reinforcing structure and said transition section than just forward of said bonded joint.

References Cited

UNITED STATES PATENTS

| | | | |
|---|---|---|---|
| 2,696,451 | 12/1954 | Snyder | 161—44 |
| 2,828,235 | 3/1958 | Holland | 161—68 |
| 2,977,265 | 3/1961 | Forsberg | 161—68X |
| 3,112,184 | 11/1963 | Hollenbach | 161—68X |
| 3,128,466 | 5/1964 | Brown | 343—872 |
| 2,683,678 | 7/1954 | Adams | 52—80 |
| 2,744,042 | 5/1956 | Pace | 343—872 |
| 2,939,186 | 6/1960 | Norwood | 52—309X |
| 3,110,064 | 11/1963 | Koontz | 52—81X |

OTHER REFERENCES

Aircraft and Missiles Manufacturing, August 1958, pp. 12–15.

BENJAMIN A. BORCHELT, Primary Examiner

S. C. BENTLEY, Assistant Examiner

U.S. Cl. X.R.

52—82, 573; 343—872